United States Patent
Takeuchi

(10) Patent No.: US 12,252,091 B2
(45) Date of Patent: Mar. 18, 2025

(54) AIRBAG BASE FABRIC AND PRODUCTION METHOD THEREFOR

(71) Applicant: TOYOBO CO., LTD., Osaka (JP)

(72) Inventor: Hiroya Takeuchi, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 18/252,929

(22) PCT Filed: Nov. 16, 2021

(86) PCT No.: PCT/JP2021/042123
§ 371 (c)(1),
(2) Date: May 15, 2023

(87) PCT Pub. No.: WO2022/102790
PCT Pub. Date: May 19, 2022

(65) Prior Publication Data
US 2024/0001885 A1    Jan. 4, 2024

(30) Foreign Application Priority Data
Nov. 16, 2020 (JP) ................... 2020-190441

(51) Int. Cl.
*B60R 21/235* (2006.01)
*D03D 1/02* (2006.01)
*D03D 15/567* (2021.01)
*D03D 15/00* (2021.01)

(52) U.S. Cl.
CPC ............ *B60R 21/235* (2013.01); *D03D 1/02* (2013.01); *D03D 15/567* (2021.01)

(58) Field of Classification Search
CPC ........ B60R 21/235; B60R 2021/23509; D03D 1/02; D03D 15/567; D03D 13/008; D03D 15/283; D06C 7/02; D10B 2331/02; D10B 2401/04; D10B 2505/124
See application file for complete search history.

(56) References Cited

U.S. PATENT DOCUMENTS

| | | | | |
|---|---|---|---|---|
| 3,015,148 A | * | 1/1962 | Haddad | D06Q 1/02 428/401 |
| 5,462,790 A | * | 10/1995 | Matsuki | D03D 15/573 442/309 |
| 5,466,514 A | * | 11/1995 | Kataoka | D03D 15/33 442/208 |
| 6,748,980 B2 | * | 6/2004 | Matsui | D03D 1/02 139/389 |
| 8,962,499 B2 | * | 2/2015 | Tanaka | D06N 3/0006 442/76 |
| 9,765,449 B2 | * | 9/2017 | Ise | B60R 21/235 |
| 10,308,209 B2 | * | 6/2019 | Ise | B60R 21/235 |
| 10,773,681 B2 | * | 9/2020 | Ise | D06M 13/252 |
| 11,746,446 B2 | * | 9/2023 | Sakai | D03D 1/02 442/59 |
| 2002/0155774 A1 | * | 10/2002 | Kitamura | D03D 1/02 280/728.1 |
| 2021/0040655 A1 | * | 2/2021 | Sakai | D03D 15/283 |
| 2022/0118937 A1 | * | 4/2022 | Sakai | D03D 1/02 |
| 2023/0264647 A1 | | 8/2023 | Takeuchi et al. | |

FOREIGN PATENT DOCUMENTS

| | | |
|---|---|---|
| CN | 104278392 | 2/2017 |
| JP | 2002/069790 | 3/2002 |
| JP | 2002/212856 | 7/2002 |
| JP | 2014/181430 | 9/2014 |
| WO | WO 2014/123090 | 8/2014 |
| WO | WO 2020/174889 | 9/2020 |
| WO | WO 2022/030505 | 2/2022 |

OTHER PUBLICATIONS

Japan Patent Office, PCT International Search Report in International Appln. No. PCT/JP2021/042123, dated Jan. 18, 2022, 4 pages, with English Translation.
Extended European Search Report in European Appln. No. 21892035.3, mailed on Sep. 11, 2024, 9 pages.

* cited by examiner

*Primary Examiner* — Robert H Muromoto, Jr.

(74) *Attorney, Agent, or Firm* — Fish & Richardson P.C.

(57) ABSTRACT

The present disclosure describes using additional yarn having a boiling-water shrinkage rate less than that of the base yarn, thereby suppressing shrinkage at the sides in the width direction of the fabric and thus reducing the difference in the crimp ratio between the center in the width direction of the fabric and the sides in the width direction. This enables the production of a fabric for airbags with high uniformity in the width direction.

2 Claims, No Drawings

AIRBAG BASE FABRIC AND PRODUCTION METHOD THEREFOR

CROSS-REFERENCE TO RELATED APPLICATIONS

This application is a National Stage application under 35 U.S.C. § 371 of International Application No. PCT/JP2021/042123, having an International Filing Date of Nov. 16, 2021, which claims priority to Japanese Application No. 2020-190441, filed on Nov. 16, 2020. The disclosures of the above-referenced prior applications are considered part of the disclosure of this application, and are incorporated in their entirety into this application.

TECHNICAL FIELD

The present invention relates to a fabric for airbags and a method for producing a fabric for airbags.

Airbags are mounted on vehicles for the purpose of protecting occupants' bodies by instant inflation with high-temperature and high-pressure gas in a collision accident of a vehicle. In order to withstand the instant inflation caused by high-temperature and high-pressure gas in the event of an accidental collision, the fabric for airbags is required to have high strength and low air permeability.

A fabric for airbags having high strength and low air permeability is weaved with high-strength yarn to achieve high density. In order to further increase the density after weaving, the resulting greige fabric is often subjected to scouring and shrinking to produce a high-quality fabric. In the present invention, the fabric after scouring and shrinkage is referred to as a "fabric for airbags."

Flaring (also called a "wavy selvage" and "loose selvage") occurs at the sides in the width direction of a conventional high-density woven fabric for airbags. Flaring is a cause of defects at the sides in the width direction of a woven fabric and a cause of other defects such as thick selvages and wrinkles when a woven fabric is rolled into a roll. Flaring is caused by a difference in the crimp ratio (shrinkage of woven yarn; the wavy state of yarn in the cross section) of the warp yarn constituting a fabric for airbags between the center in the width direction of the fabric and the sides in the width direction of the fabric.

When cutting is performed in the above, multiple fabric sheets are typically stacked to cut off fringe formed during weaving and cut off the sides in the width direction with many defects. An increase in the flaring rate requires cutting off more portions, resulting in an increase in waste. Further, since the height of the input port of the cutting machine is limited, the sides in the width direction of stacked fabric sheets can become too bulky to fit into the input port of the cutting machine, which results in a reduction in the number of sheets that can be cut at one time, thus causing the problem of decreasing work efficiency.

CITATION LIST

Patent Literature

PTL 1: JP 2014-181430

SUMMARY OF INVENTION

Technical Problem

Although Patent Literature (PTL) 1 specifies a desirable boiling-water shrinkage rate of yarn constituting a fabric, PTL 1 nowhere discloses a technology to improve the uniformity of a woven fabric by adding yarn having a different boiling-water shrinkage rate; thus, the uniformity between the center in the width direction of the fabric and the sides in the width direction of the fabric is unsatisfactory. The present invention provides a technology for improving the uniformity of a woven fabric by using specific additional yarn having a boiling-water shrinkage rate different form that of the base yarn, which constitutes an airbag fabric, to reduce the difference in the crimp ratio between the warp yarn at the center in the width direction of the fabric and the warp yarn at the sides in the width direction of the fabric.

Solution to Problem

As a result of an extensive research, the present inventor found that the above object can be achieved by the following embodiments. The present invention has thus been accomplished.

Specifically, the present invention encompasses the following embodiments.

(1) A fabric for airbags comprising unremoved fringe at both sides in the width direction of the fabric, the fabric comprising at least two additional yarns at each of the sides in the width direction,
wherein
the crimp ratio of warp yarn aligned in the center in the width direction of the fabric is within the range of 7 to 20%, the crimp ratio of warp yarn aligned at the sides in the width direction of the fabric is 3 to 15% or less, and
the difference in the crimp ratio between the warp yarn aligned at the sides and the warp yarn aligned in the center is 5.0% or less.

(2) The fabric for airbags according to Item (1), wherein the additional yarn has a boiling-water shrinkage rate less than that of a base yarn, which constitutes the fabric for airbags, and the difference in the boiling-water shrinkage rate between the additional yarn and the base yarn is 0.8% or more.

(3) A method for producing the fabric for airbags of Item (1), comprising
incorporating, at each side in the width direction of the fabric, at least two additional yarns in which the boiling-water shrinkage rate of a base yarn is greater than the boiling-water shrinkage rate of the additional yarn, and the difference in the boiling-water shrinkage rate between the base yarn and the additional yarn is 0.8% or more, and
then performing scouring and shrinking.

Advantageous Effects of Invention

The incorporation of additional yarn having a different boiling-water shrinkage rate from that of the base yarn (boiling-water shrinkage rate of base yarn>boiling-water shrinkage rate of additional yarn) suppresses deformation by shrinkage at the sides in the width direction of the fabric because the boiling-water shrinkage of the base yarn is suppressed due to the presence of adjacent additional yarn, which shrinks less than the base yarn. This reduces the change in the crimp ratio of the warp yarn at the sides in the width direction and maintains the crimp ratio to be almost equal to the crimp ratio at the center in the width direction of the fabric, which consequently reduces the flaring rate.

DESCRIPTION OF EMBODIMENTS

The fabric for airbags according to the present invention is a woven fabric formed from a synthetic-fiber multifilament. The synthetic-fiber multifilament that constitutes the fabric for airbags has a total fineness of preferably 200 to 600 dtex, and more preferably 300 to 550 dtex. A total fineness of 200 dtex or more, due to the elimination of the need for overly increasing the weaving density, reduces an excessive increase in binding force of the warp and weft yarn, thus making it easier for the packageability in an airbag module to fall within an appropriate range. A total fineness of 600 dtex or less makes it easier to reduce an excessive increase in rigidity of the yarn that constitute the woven fabric. A synthetic-fiber multifilament having a total fineness within the range of 200 dtex or more and 600 dtex or less is preferable because such a synthetic-fiber multifilament makes it easier to obtain a fabric for airbags that is moderately flexible and thus excellent in packageability in a module.

In the present invention, the total fineness of synthetic-fiber multifilament that constitutes the fabric for airbags is determined as follows. The warp and weft yarns of a fabric obtained through a dry-finishing process are each removed from the fabric, and measurement is performed in accordance with JIS L 1013 (2010), 8.3.1. Specifically, a sample with a length of cm is accurately taken with an initial tension applied. The absolute dry mass is measured, and the fineness based on corrected weight (dtex) is calculated using the following formula. The average of five measurements is determined to be the total fineness.

$$F0 = 10000 \times m/0.9 \times (100+R0)/100$$

F0: Fineness based on corrected weight (dtex)
m: Absolute dry mass of sample (g)
R0: Official moisture content (8)

The fabric for airbags according to the present invention is woven with base yarn (warp and weft yarns that constitute the fabric for airbags) and woven by further incorporating additional yarn having specific physical properties. The boiling-water shrinkage rate of the additional yarn is preferably less than the boiling-water shrinkage rate of the base yarn, which constitutes the airbag fabric. In particular, the boiling-water shrinkage rate of the additional yarn is preferably less than the boiling-water shrinkage rate of the base yarn (warp yarn).

In order to suppress flaring due to shrinkage at the sides in the width direction of the fabric during scouring and shrinking and during drying, the difference in the boiling-water shrinkage rate between the base yarn and the additional yarn is preferably 0.8 to 20%, more preferably 1.5 to 15%, and particularly preferably 4 to 12%. A difference in the boiling-water shrinkage rate between the base yarn and the additional yarn of below 0.8% reduces the effect of suppressing deformation due to shrinkage, whereas a difference in the boiling-water shrinkage rate between the base yarn and the additional yarn exceeding 20% adversely affects strength, air permeability, etc. since the base yarn shrinks too much, thereby damaging the weave structure.

The boiling-water shrinkage rate of the base yarn and the additional yarn used in the fabric for airbags according to the present invention may be such that boiling-water shrinkage rate of the base yarn>boiling-water shrinkage rate of the additional yarn, and it is effective that the difference between them is 0.8% or more. The additional yarn may be multifilament yarn, monofilament yarn, false-twisted yarn, or crimped yarn. The material thereof can be nylon 66 fiber, nylon 6 fiber, polyester fiber, etc. Typically, nylon 66 fiber is often used for the base yarn for the fabric for airbags. Since polyester fiber has a boiling-water shrinkage rate lower than that of nylon 66 fiber, it is preferable to use nylon 66 fiber for the base yarn and polyester fiber for the additional yarn.

In the present invention, the weaving density is measured in accordance with JIS L 1096 (2010), 8.6.1.

More specifically, a sample is placed on a flat table, and unnatural wrinkles and tension are removed. Then, the number of warp yarns and the number of weft yarns in a 2.54-cm section at five different points are counted, and the average of each of them in terms of the unit length is calculated to determine the weaving density.

In the present invention, the boiling-water shrinkage rate of the original yarn is measured in accordance with dimensional change rate by boiling water, filament dimensional change rate (method B), specified in JIS L 1013 (2010). Specifically, the boiling-water shrinkage rate is measured as follows. An initial tension is applied to a sample, and two points 500 mm apart are marked. The initial tension is then removed, and the sample is immersed in hot water at 100° C. for 30 minutes. The sample is then taken out, and water is gently wiped away with blotting paper or a cloth. The sample is air-dried, and then the initial tension is applied again. The length between the two points is measured, and the dimensional change rate by boiling water (%) is calculated using the following formula. The average of three measurements is determined to be the boiling-water shrinkage rate.

$$\Delta L = (L-500)/500 \times 100$$

$\Delta L$: Boiling-water shrinkage rate (3)
L: Length between two points (mm)

The material of the synthetic-fiber multifilament that constitutes the fabric for airbags according to the present invention is not particularly limited, and can be selected from a wide range of materials. To meet the characteristics described above, while taking economic efficiency into account, it is preferable to use a multifilament composed of a polyamide based-resin such as nylon 6, nylon 66, or nylon 46, or a multifilament composed of a polyester-based resin that contains mainly polyethylene terephthalate.

The synthetic-fiber multifilament that constitutes the fabric for airbags according to the present invention may contain various additives that are typically used for improving the productivity or characteristics in the production process for the original yarn or in the production process for the fabric. The synthetic-fiber multifilament that constitutes the fabric for airbags according to the present invention may contain, for example, at least one member selected from the group consisting of heat stabilizers, antioxidants, light stabilizers, lubricants, antistatic agents, plasticizers, thickening agents, pigments, and flame retardants.

The number of additional yarns in the fabric for airbags according to the present invention is not particularly limited. As the number increases, the effect is likely to increase. Considering the operability etc., the number of additional yarns is preferably 2 to 12. However, since each production facility varies, the number of additional yarns is not limited as long as the operability and quality are not impaired.

The width of the fabric for airbags according to the present invention is not particularly limited; however, the greater the width, the more likely that flaring will occur. The width of 160 cm or more is effective, and the width of 180 cm or more is particularly effective.

The flaring reduction technique of the present invention particularly effectively works for a high-density woven fabric. The fabric for airbags according to the present invention preferably has a cover factor of 1800 to 2600, and particularly preferably 2000 to 2500.

The CF is measured using the following formula:

$$CF=(A\times 0.9)^{1/2}\times(W1)+(B\times 0.9)^{1/2}\times(W2)$$

wherein A and B indicate the thickness of warp and weft yarn (dtex), and W1 and W2 indicate a warp weaving density and a weft weaving density (yarns/2.54 cm).

The structure of the woven fabric of the fabric for airbags according to the present invention is not particularly limited and can be a plain weave, a twill weave, a sateen weave, or a variation of these weaving patterns.

In the fabric for airbags according to the present invention, a plurality of additional yarns having a difference in the boiling-water shrinkage rate from that of the base yarn of 0.8% or more (boiling-water shrinkage rate of the base yarn>boiling-water shrinkage rate of the additional yarns) are incorporated into the selvages. Accordingly, in the fabric for airbags comprising unremoved fringe at both sides in the width direction of the fabric, the difference in the crimp ratio between the warp yarn aligned in the center in the width direction of the fabric and the warp yarn aligned at the sides in the width direction of the fabric is 5.0% or less, thereby suppressing flaring.

Furthermore, the fabric for airbags according to the present invention can be further coated, as necessary, with silicone resin or the like, which can further improve low air permeability. Such a fabric can be effectively used as a fabric for coated airbags.

EXAMPLES

The structure and effect of the present invention are described below in detail with reference to Examples.
Measurement of Crimp Ratio The crimp ratio was measured in accordance with the method specified in JIS L 1096, 8.7, method B.

As samples, ten yarns were taken from the center in the width direction of the fabric. Additionally, from the sides in the width direction of the fabric, ten base yarns, excluding the additional yarn, were taken from each of the left and right sides at the endmost in the width direction. Then, the average of the center in the width direction of the fabric and the average of the sides in the width direction of the fabric were determined. The crimp ratio was compared between the right side in the width direction of the fabric and the center in the width direction of the fabric, and between the left side in the width direction of the fabric and the center in the width direction of the fabric, and the greater difference was determined to be the difference in the crimp ratio.
Weaving Density of Fabric The measurement was performed in accordance with JIS L 1096 (2010), 8.6.1. More specifically, a sample was placed on a flat table, and unnatural wrinkles and tension were removed. The number of warp and weft yarns in a 2.54-cm section was counted and determined to be the density. The number of measurements was at least n=35 at 5-cm intervals from the base of the fringe, and both vertical and horizontal densities were measured. The difference therebetween was calculated at each measurement point.

Example 1

Using a nylon 66 filament original yarn having a fineness of 470 dtex/144f and a boiling-water shrinkage rate of 8.4% (the monofilament cross-section was round) in the weft and warp direction of the base yarn, weaving was performed in a plain weave pattern by incorporating two additional yarns having a boiling-water shrinkage rate of 0.3% into each side (four additional yarns in total) with a water-jet loom so that the weft and warp both had a weaving density of 53.0 yarns/2.54 cm. Thereafter, the fabric was passed through a hot-water shrinkage tank at 98° C. without drying and then continuously passed through a dry-finishing process using a two-step suction drum dryer in which the first step was adjusted to have a temperature T1 of 130° C., and the second step was adjusted to have a temperature T2 of 135° C.

Example 2

Using a nylon 66 filament original yarn having a fineness of 470 dtex/144f and a boiling-water shrinkage rate of 8.4% (the monofilament cross-section was round) in the weft and warp direction of the base yarn, weaving was performed in a plain weave pattern by incorporating 10 additional yarns having a boiling-water shrinkage rate of 0.3% into each side (20 additional yarns in total) with a water-jet loom so that the weft and warp both had a weaving density of 53.0 yarns/2.54 cm. Thereafter, the fabric was passed through a hot-water shrinkage tank at 98° C. without drying and then continuously passed through a dry-finishing process using a two-step suction drum dryer in which the first step was adjusted to have a temperature T1 of 130° C., and the second step was adjusted to have a temperature T2 of 135° C.

Example 3

Using a nylon 66 filament original yarn having a fineness of 470 dtex/144f and a boiling-water shrinkage rate of 8.4% (the monofilament cross-section was round) in the weft and warp direction of the base yarn, weaving was performed in a plain weave pattern by incorporating 10 additional yarns having a boiling-water shrinkage rate of 6.8% into each side (20 additional yarns in total) with a water-jet loom so that the weft and warp both had a weaving density of 53.0 yarns/2.54 cm. Thereafter, the fabric was passed through a hot-water shrinkage tank at 98° C. without drying and then continuously passed through a dry-finishing process using a two-step suction drum dryer in which the first step was adjusted to have a temperature T1 of 130° C., and the second step was adjusted to have a temperature T2 of 135° C.

Comparative Example 1

Using a nylon 66 filament original yarn having a fineness of 470 dtex/144f and a boiling-water shrinkage rate of 8.4% (the monofilament cross-section was round) in the weft and warp direction of the base yarn, weaving was performed in a plain weave pattern with a water-jet loom so that the weft and warp both had a weaving density of 53.0 yarns/2.54 cm. Thereafter, the fabric was passed through a hot-water shrinkage tank at 98° C. without drying and then continuously passed through a dry-finishing process using a two-step suction drum dryer in which the first step was adjusted to have a temperature T1 of 130° C., and the second step was adjusted to have a temperature T2 of 135° C.

TABLE 1

| | Total number of additional yarns (yarns) | Boiling-water shrinkage rate of base yarn (%) | Boiling-water shrinkage of additional yarn (%) | Warp crimp ratio (%) | | | Difference in warp crimp ratio | |
| | | | | Left side of fabric | Center | Right side of fabric | Between center and left side of fabric | Between center and right side of fabric |
|---|---|---|---|---|---|---|---|---|
| Ex. 1 | 4 | 8.4 | 0.3 | 5.5 | 9.9 | 5.9 | 4.3 | 3.9 |
| Ex. 2 | 20 | 8.4 | 0.3 | 7.1 | 10.4 | 7.6 | 3.3 | 2.8 |
| Ex. 3 | 20 | 8.4 | 6.8 | 6.3 | 10.1 | 6.0 | 3.8 | 3.7 |
| Comp. Ex. 1 | 0 | 8.4 | — | 4.2 | 9.7 | 4.3 | 5.5 | 5.4 |

INDUSTRIAL APPLICABILITY

The present invention can improve the quality of fabric for airbags by reducing the difference in the crimp ratio between the center in the width direction of the fabric and the sides in the width direction of the fabric, and contributes to reduction in costs in the airbag manufacturing industry.

The invention claimed is:

1. A fabric for airbags comprising unremoved fringe at both sides in the width direction of the fabric, the fabric comprising at least two additional yarns at each of the sides in the width direction,
    wherein the crimp ratio of warp yarn aligned in the center in the width direction of the fabric is within the range of 7 to 20%,
    the crimp ratio of warp yarn aligned at the sides in the width direction of the fabric is 3 to 15% or less,
    the difference in the crimp ratio between the warp yarn aligned at the sides and the warp yarn aligned in the center is 5.0% or less, and
    the additional yarn has a boiling-water shrinkage rate less than that of a base yarn, which constitutes the fabric for airbags, and the difference in the boiling-water shrinkage rate between the additional yarn and the base yarn is 0.8% or more.

2. A method for producing the fabric for airbags of claim 1, comprising
    incorporating, at each side in the width direction of the fabric, at least two additional yarns in which the boiling-water shrinkage rate of a base yarn is greater than the boiling-water shrinkage rate of the additional yarn, and the difference in the boiling-water shrinkage rate between the base yarn and the additional yarn is 0.8% or more, and
    then performing scouring and shrinking.

* * * * *